March 2, 1971     P. K. CHATTERJEA     3,566,716
CLUTCH CYLINDER CIRCUIT AND CHARGING VALVE THEREFOR
Filed July 22, 1969     4 Sheets-Sheet 1

FIG. 1.

Inventor:
Probir K. Chatterjea
By John W. Gaines
Atty.

March 2, 1971  P. K. CHATTERJEA  3,566,716
CLUTCH CYLINDER CIRCUIT AND CHARGING VALVE THEREFOR
Filed July 22, 1969  4 Sheets-Sheet 2
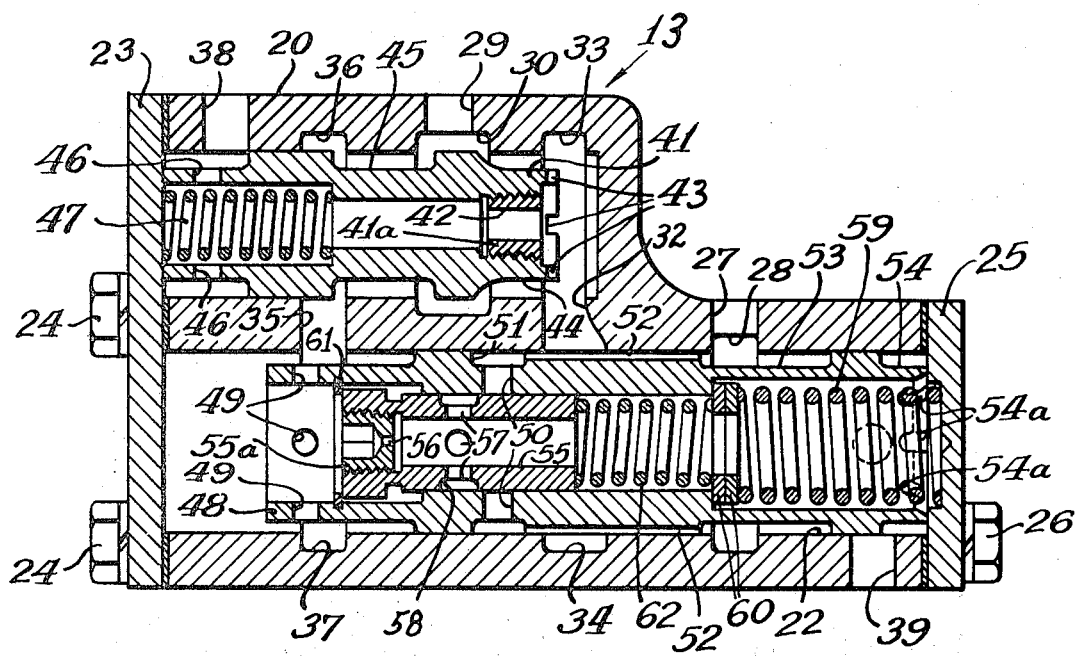
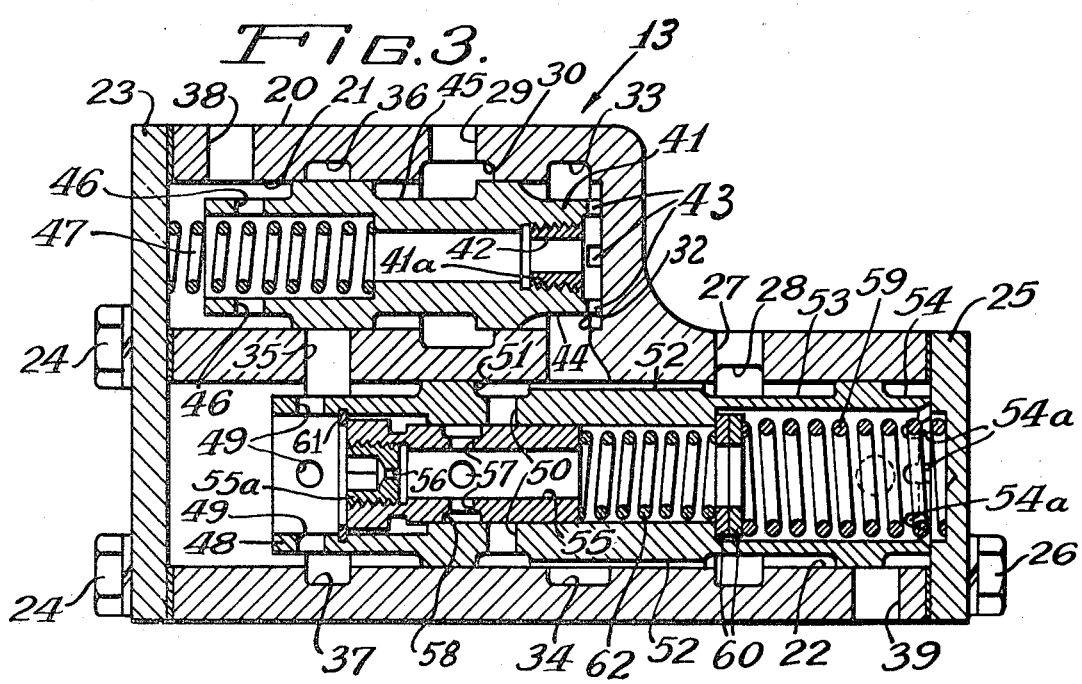
Inventor:
Probir K. Chatterjea
By John W. Isaacs
Atty.

Inventor:
Probir K. Chatterjea

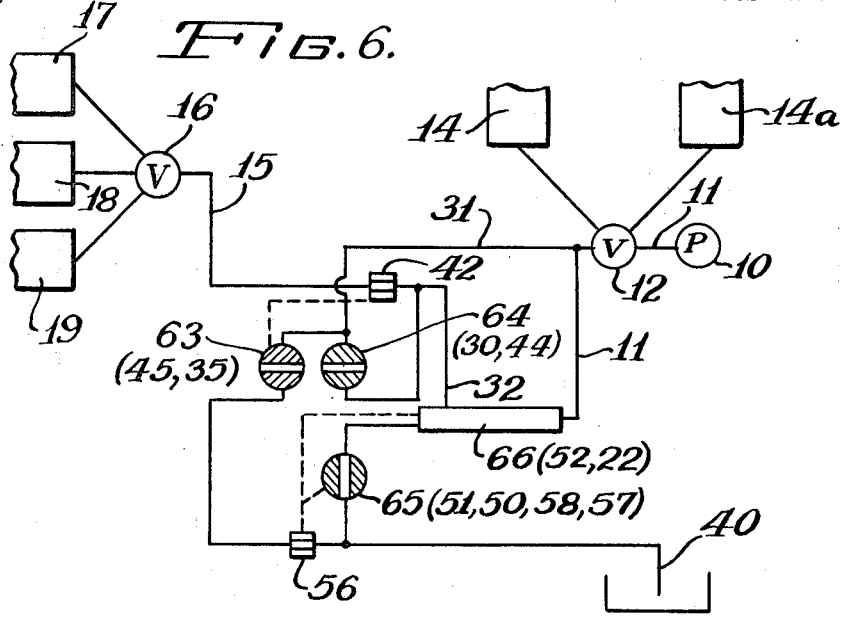
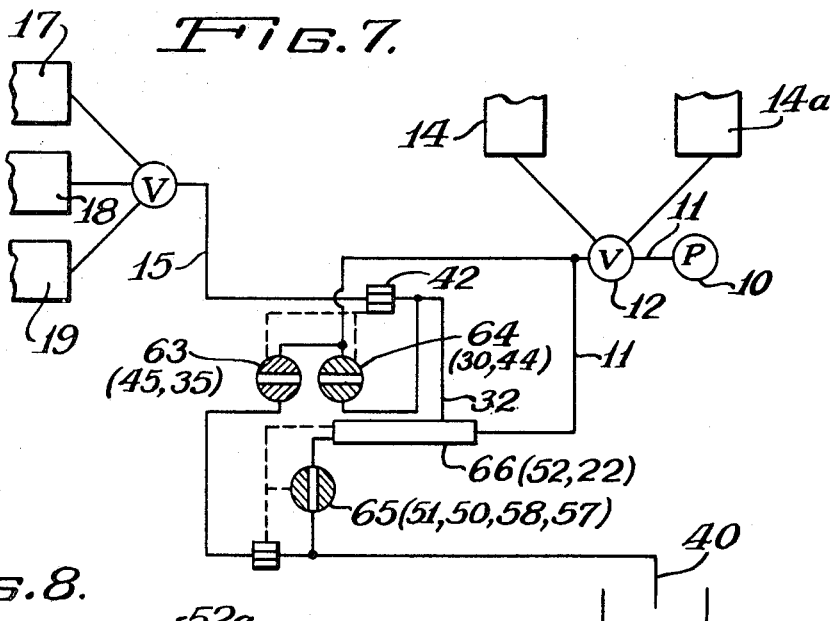
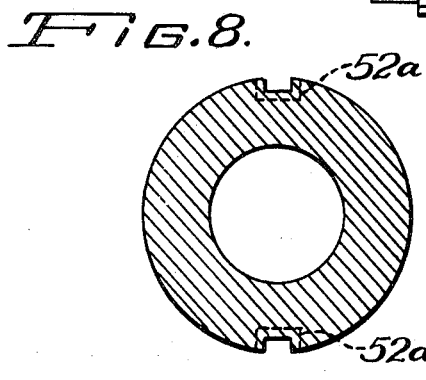

United States Patent Office 3,566,716
Patented Mar. 2, 1971

3,566,716
CLUTCH CYLINDER CIRCUIT AND CHARGING VALVE THEREFOR
Probir K. Chatterjea, Evanston, Ill., assignor to International Harvester Company, Chicago, Ill.
Filed July 22, 1969, Ser. No. 843,362
Int. Cl. G05g 19/00; F01b 21/00
U.S. Cl. 74—856                                   21 Claims

ABSTRACT OF THE DISCLOSURE

Hydraulic mechanism in a transmission for engaging a clutch for forward or reverse before a clutch for first, second or third speed. Flow of pressure fluid to the latter clutch is by way of a quick-fill spool having a large orifice, a rate-of-rise spool, and a poppet therein having a small orifice. A restricted orifice of appreciable length is used in connection with the spools and the poppet in such a way that, after the power unit for the clutch for first, second or third speed is filled with fluid, pressure of the fluid in the power unit is slowly raised to its maximum.

---

This invention relates to the control of hydraulic fluid for operating the power units for the clutches of an automotive transmission. More specifically, the invention relates to a sequenced actuation of power units for clutches of a tractor transmission.

It is desirable in the operation of a tractor to control the clutches for forward and reverse from the same hydraulic circuit is the clutches for first, second, and third speeds and to set a control both for direction and for speed at the same time. Yet, the direction clutch should be fully engaged before the speed clutch in order to avoid certain undesirable conditions in the operation of the tractor transmission. It is proposed to accomplish the aforesaid sequenced engagement of the clutches by the use of a delaying mechanism in the supply of hydraulic fluid to the power unit for the speed clutch.

My invention thus has a two-fold purpose: immediately to make engagement of one clutch in a power train without delay and subsequently to make engagement of a second clutch in the same train substantially shock free and yet without unnecessary delay.

My invention specifically provides an improved procedure to make the shock-free engagement of the second clutch, wherein a quick fill and slack take-up step takes place therein by a preliminarily directed substantial flow of fluid in a first path to the second clutch, followed by the steps of production and application of a signal responsive to flow of pressure fluid in the first path so as initially to insert a major portion of the length of a long restriction in the path, directing the flow in a second fluid path from the remaining portion of the restriction to drain, and production and application of a signal responsive to the flow of pressure fluid in the first path so as slowly and progressively to decrease the portion of the length of the restriction in the first named fluid path and increase the restriction in the second fluid path to a point at which the major portion of the restriction length is included in the second fluid path.

One important structural feature for carrying out the foregoing procedure is that the first path includes a pressure tap point on the restriction variably spaced from that one end of the length of the restriction which is connected to drain, thereby providing a significant procedural feature characterized by the step of linearly shifting the tap point from said one end by a distance along the length of the restriction so that the magnitude of pressure tapped off varies as a function of the distance from said one end. The convenient hydraulic analogy of a valve to control the current of fluid flowing is not applicable, and an electrical potentiometer and potentiometer tap are the closest analogy because the tapping point hereof taps off precise fluid pressures, much the same as electrical potential but not the same as a flow of fluid, current, or the like.

In one physically constructed embodiment of the invention, given at this point purely by way of an illustrative example of times and pressures, the quick fill and slack take-up step for the second clutch, i.e., the selected speed clutch, took 0.1 second between start and completion under 30 p.s.i. clutch cylinder pressure as the first stage. The second stage followed without interruption and took 0.6 second from a start at 30 p.s.i. to the completion of the full clutch engagement at 250 p.s.i.

An object of the present invention is to provide a mechanism for slowing the actuation of a hydraulic power clutch, brake, or like power unit.

Another object of the invention is to provide a hydraulic control mechanism through which full flow of pressure fluid is provided at the outset for quick filling of a hydraulic power unit and a restricted connection is inserted to slow the buildup of pressure in the hydraulic power unit while part of the pressure fluid is bypassed to drain. Total flow is negligible in the restriction, the importance of which is to precisely provide infinite pressure level taps throughout the pressure range afforded by the restriction.

Other objects will appear from the following description and the attached drawings in which:

FIG. 1 is a combination sectional and diagrammatic view showing the hydraulic mechanism of the present invention in its initial position and the connections of the hydraulic mechanism to a pressure-fluid source, drain, and power units for direction and speed clutches of a transmission;

FIG. 2 is a sectional view of the present hydraulic mechanism similar to FIG. 1, but in a slow rate-of-rise arrangement with the parts thereof displaced by hydraulic fluid as desired at the outset of operation;

FIG. 3 is a similar sectional view, showing the parts of the mechanism just after flow of hydraulic fluid to the power unit for the speed clutches has been stopped;

FIG. 6 is a view similar to FIG. 4, but with the parts of the hydraulic mechanism in the position of FIG. 3;

FIG. 7 is a view similar to FIG. 4 but with the parts of the hydraulic mechanism on the way from the position of FIG. 3 back to that of FIG. 1; and FIG. 8 shows in cross section a modified shiftable restriction.

Figure 4:
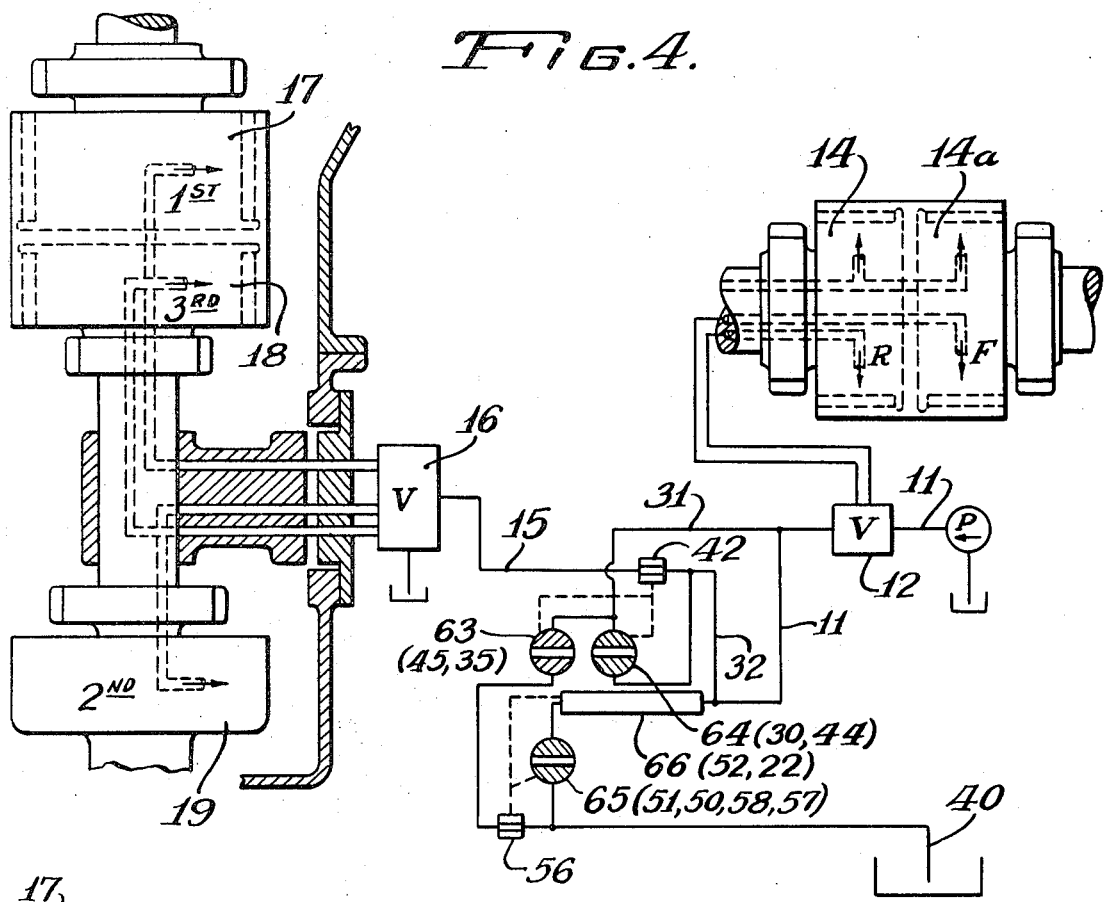
FIG. 4 is a partially diagrammatic view of the power units for the clutches and the present hydraulic mechanism, the parts of the hydraulic mechanism being in the position of FIG. 1.

As shown in FIG. 1, hydraulic fluid under pressure is supplied from a source such as a pump 10 through a line 11 to a valve 12 connected in the line 11 and to a hydraulic mechanism 13 of the present invention. The valve 12 permits the pressure fluid to flow through the line 11 to the hydraulic mechanism 13 and selectively to hydraulic power unit 14 or hydraulic power unit 14a, one of units 14 and 14a actuating a clutch (not shown) for forward drive of a tractor (not shown) by a transmission (not shown), the other of units 14 and 14a actuating the clutch (not shown) for reverse drive. From the mechanism 13 the pressure fluid flows through line 15 a valve 16 and thence selectively to hydraulic power units 17, 18, and 19 operating clutches (not shown) for the first, second, or third speed of the tractor transmission. It is to be understood that a controller (not shown) acts simultaneously against valves 12 and 16, with six positions of the controller determining the setting of the tractor transmission in forward or reverse at first, second, or third speed. The pressure fluid reaches full pressure in the power unit 14 or 14a for forward or reverse very quickly, whereas mechanism 13 causes the fluid in the power unit 17, 18, or 19 for first, second, or third speed to reach full pressure more slowly, as will presently be apparent. Thus, the desired objective is reached of actuating the direction clutch before the speed clutch.

The mechanism 13 includes a body 20 having parallel spaced cylindrical bores 21 and 22. The bore 21 has a blind or closed end in the body 20, and the other end is closed by a plate 23 secured by screws 24 to the body 20. The bore 22 is relatively long and extends all the way through the body 20, being closed at one end by the plate 23 and at the other end by a plate 25 secured to the body 20 by screws 26. The body 20 has an inlet passage 27 to which the line 11 is connected and which connects with the bore 22 through a peripheral groove 28 formed on the bore 22 at a region near but spaced from the end of the bore 22 where the plate 25 is located. An inlet passage 29 formed in the body 20 is connected with the bore 21 through a peripheral groove 30 formed on a region near but spaced from the blind end of the bore 21. The inlet passage 29 is connected with the line 11 by a line 31. A connecting passage 32 between the bores 21 and 22 is connected to the blind end of the bore 21 by a peripheral groove 33 formed thereon and to the bore 22 through a peripheral groove 34 located at an intermediate region of the bore 22 farther from the cover plate 25 than the peripheral groove 28 is. A connecting passage 35 between the bores 21 and 22 is connected to the bore 21 through a peripheral groove 36 on bore 21 and a peripheral groove 37 on bore 22. The groove 36 is between and spaced from the groove 30 and the end of the bore 21 closed by the cover 23, and the groove 37 is near but spaced from the end of the bore 22 closed by the cover 23. The line 15 is connected to the body 20 at an outlet passage 38, which opens into the bore 21 at a region thereof near the end covered by the plate 23 and closer thereto than the connecting passage 35 is. The bore 22 has adjacent the end where the plate 25 is located, a drain passage 39 to which a drain line 40 is connected.

A quick-fill spool 41 is mounted in the bore 21 and has at its end adjacent the blind end of the bore 21 an insert 41a having a relatively large orifice 42, for example, .218 inch in diameter. The same end of the spool 41 has peripherally spaced notches 43 and an external peripheral recess 44. The quick-fill spool 41 has at an intermediate region an external wide annular groove 45. Near the end adjacent the plate 23, the spool 41 has a plurality of peripherally spaced side openings 46. A cylindrical coil spring 47 acts between the plate 23 and the spool 41 at an internal shoulder thereon facing and spaced from the end of the spool 41 near the plate 23, to urge the spool 41 to the retracted position of FIG. 1, in which the spool 41 engages the blind end of the bore 21.

A rate-of-rise spool 48 is positioned in the bore 22 and has adjacent its end at the plate 23 a plurality of peripherally spaced lateral openings 49. At an intermediate region, the spool 48 has a plurality of circumferentially spaced side openings 50 and an external annular groove 51 communicating with the outer ends of the openings 50. The openings 50 and groove 51 are spaced from the end of the spool 48 at plate 23, but are closer to this end than the other end of the spool. Two diametrally opposed external narrow shallow channels 52 formed on the spool 48 extend longitudinally thereof from the groove 51 in a direction away from plate 23. The channels 52 may be, for example, ⅛ inch wide and ⅟₁₆ inch deep, and are of appreciable length, for example, 1¼ inches. A wide exterior annular groove 53 is formed on the spool 48 at the ends of the channels 52 remote from the groove 51. The groove 53 is somewhat deeper than the channels 52. The side of the groove 53 remote from the channels 52 is near but spaced from an external peripheral recess 54 which is formed on the end of the spool 48 adjacent the plate 25. This end of the spool 48 also has a plurality of peripherally spaced notches 54a.

A poppet 55 is mounted in the spool 48 and carries at its end adjacent the plate 23 an insert 55a having a relatively small orifice 56, for example, .045 inch in diameter. The poppet 55 has a plurality of peripherally spaced side openings 57 and an external annular groove 58 in which the outer ends of the openings 57 terminate.

The spool 48 is held in the retracted position shown in FIG. 1, involving engagement of one end of the spool with the plate 23, by means of a cylindrical coil spring 59 which acts between the plate 25 and a pair of washers 60 resting against an internal shoulder on the spool 48 facing and spaced from the end thereof near the plate 25. The poppet 55 is held in the position of FIG. 1 with respect to the spool 48 by means of a split ring 61 engaging one end of the poppet 55 and an internal groove in the spool 48, and a cylindrical coil spring 62 acting against the other end of the poppet 55 and the pair of washers 60.

When the quick-fill spool 41, the rate-of-rise spool 48, and the poppet 55 are in the position shown in FIG. 1, pressure fluid coming from the pump 10 through the valve 12 may enter the mechanism 13 through the line 11. The pressure fluid proceeds from the line 11 through the inlet passage 27, annular groove 28 in the body 20, annular groove 53 on the spool 48, connecting passage 32 in the body 20, and notches 43 in the end of the quick-fill spool 41 to the interior thereof. Thence, the pressure fluid passes to the opposite end of the spool 41 and the side openings 46 therein and out of the body 20 through the outlet passage 38 and the line 15 through the valve 16, from which the fluid goes to the appropriate power unit 17, 18, or 19.

The large flow of pressure fluid thus occurring across the orifice 42 in the insert 41a in the quick-fill spool 41 produces a pressure differential across the orifice which compresses the spring 47 and moves the spool 41 to the advanced position of FIG. 2 in which the end of the spool 41 engages the plate 23. The shift of the spool 41 causes the annular groove 45 on the spool 41 to overlap the connecting passage 35 in the body 20 and the peripheral recess 44 on the end of the spool 41 to overlap the peripheral groove 30 in the body 20. Now pressure fluid enters the body 20 by way of the line 31 and inlet passage 29 and proceeds in one path through the groove 30, the recess 44, and notches 43 to the interior of the spool 41, whence it flows to the valve 16. In another path, the pressure fluid entering the body 20 by way of the line 31 proceeds by way of the annular groove 45 on the spool 41 and connecting passage 35 in the body 20 to the bore 22 where the fluid enters the rate-of-rise spool 48 by way of the side openings 49 and acts against the insert 55a with its small orifice 56 to move the spool 48 with respect to the body 20 and the poppet 55 with respect to the spool 48 to the position of FIG. 2. In these movements, the springs 59 and 62 are compressed. Pressure fluid entering the spool 48 by way of the openings 49 therein escapes to drain by way of the small orifice in the insert 56, the interiors of the poppet 55 and spool 48, the end notches 54a, the peripheral recess 54 on the end of the spool 48, the drain opening 39 in the body 20, and drain line 40.

Movement of the spool 48 and the poppet 55 as just described will have brought these parts to the position of FIG. 2, in which the side openings 50 and 57 of the spool 48 and poppet 55 are in communication with one another through the groove 58, and a portion of the length of longitudinal grooves 52 on the spool 48 serves as a connection between the wide annular groove 53 on the spool 48 and the connecting passage 32 in the body 20. At the same time, a part of the length of the grooves 52 remains as a connection between the connecting passage 32 and the communicating openings 50 and 57 leading to the interiors of the spool 48 and the poppet 55 so that a portion of the pressure fluid delivered to the hydraulic mechanism 13 by way of the line 31 escapes to drain by way of the groove 30 in the body 20, recess 44 on spool 41, connecting passage 32 in body 20, grooves 52 on spool 48, openings 50 and 57 in spool 48 and poppet 55, the interior of spool 48 and poppet 55, and the notches 54a and recess 54 at the end of the spool 48 at the plate 25.

When the flow of pressure fluid through the quick-fill spool 41 to the appropriate power unit 17, 18 or 19 stops, the spring 47 returns the spool 41 to its original or retracted position as shown in FIG. 3. The grooves 30 and 45 no longer overlap connecting passage 35 and peripheral recess, respectively, and so the line 31 is blocked.

Now the power unit 17, 18, or 19 being actuated is connected to the pump 10 only by way of the line 11, inlet passage 27 in body 20, annular groove 53, and a major portion of the length of the longitudinal grooves 52 on the rate-of-rise spool 48. The pump 10 is connected to drain over the length of the longitudinal grooves 52, or more particularly the portions thereof not coextensive with the connecting passage 32, and the pump is connected to the power unit 17, 18, or 19 for the selected clutch through only one of said portions of the length of the longitudinal grooves 52 in the spool 48. Thus, the pressure in the connecting passage 32 in the body 20, which is the pressure at the appropriate power unit 17, 18, or 19, is intermediate the drain pressure and the pump pressure.

SLOW RATE-OF-RISE—FIG. 2

With the spool 41 in its original or retracted position, the annular groove 45 thereon no longer overlaps the connecting passage 35 in the body 20, and pressure fluid is no longer supplied through passage 35 to the end of the spool 48 adjacent the plate 23. Now the spring 59 returns the spool 48 to the retracted or original position of FIG. 1, but does so slowly, because fluid that is trapped at the end of the spool at the plate 23 and in the connecting passage 35 by closing of the latter by return of spool 41 to its retracted position can escape only slowly to drain through the small orifice in the insert 56 in the poppet 55. During the relatively slow return of the spool 48 to the original position of FIG. 1, longitudinal grooves 52 on the spool 48 move with respect to the connecting passage 32 in the body 20, and so progressively the part of the length of the grooves 52 connected between the annular groove 53 and connecting passage 32 and thus between the pump 10 and the power unit 17, 18, or 19 becomes smaller until finally in the position of FIG. 1, the longitudinal grooves 52 in no way form a connection between the pump and the power unit.

This means that the pressure in the connecting passage 32 and in the appropriate power unit 17, 18, or 19 gradually rises and finally reaches the pressure of the pump 10. At the same time, a greater portion of the longitudinal grooves 52 lie between the connecting passage 32 and the openings 50 and 57 in the spool 48 and poppet 55 leading to drain, so that on this account pressure in the connecting passage 32 increases progressively above drain pressure. Finally drain is cut off as the openings 50 and 57 in the spool 48 and poppet 55 move out of communication with one another when the spool 48 and poppet 55 have returned to the original or retracted position of FIG. 1.

Reference is made to FIGS. 4 to 7 for a more complete understanding of the present invention. In these figures lines are used to represent paths for flow of pressure fluid through the present hydraulic mechanism. Moreover, valves 63, 64 and 65 and a long restricted orifice 66 are shown. Valve 63 comprises the annular groove 45 on the quick-fill spool 41 and the connecting passage 35 in the body 20 between the bores 21 and 22. Valve 64 is composed of the peripheral groove 30 in the body 20 and the external peripheral recess 44 formed on the end of the quick-fill spool 41. Valve 65 comprises annular groove 51 and side openings 50 on the rate-of-rise spool 48 and the annular groove 58 and the side openings 57 on the poppet 55. The long restricted orifice 66 is really two such orifices each formed of the long grooves 52 on the rate of rise spool 48 and the bore 22 in the body 20.

Dotted lines connect the orifice 42 in the quickfill spool 41 with the valves 63 and 64 to show that the valves 63 and 64 are operated by the orifice 42. Thus as previously described with reference to FIGS. 1, 2 and 3, flow of pressure fluid through the orifice 42 or the absence of such flow determines whether or not the annular groove 45 on the spool 41 overlaps the connecting passage 35 in the body 20. Similarly, the presence or absence of such flow determines whether or not the peripheral recess 44 on the spool 41 overlaps the peripheral groove 30 in the body 20.

Dotted lines connect the orifice 56 with the valve 65 and the long orifice 66 to show that the orifice 56 controls the valve 65 and the long orifice 66. Thus as previously described with reference to FIGS. 1, 2 and 3, the flow of pressure fluid through the orifice 56 or the absence of such flow determines whether or not the valve 65 is open and also the position of the grooves 52 with respect to the connecting passage 32.

Figure 5:
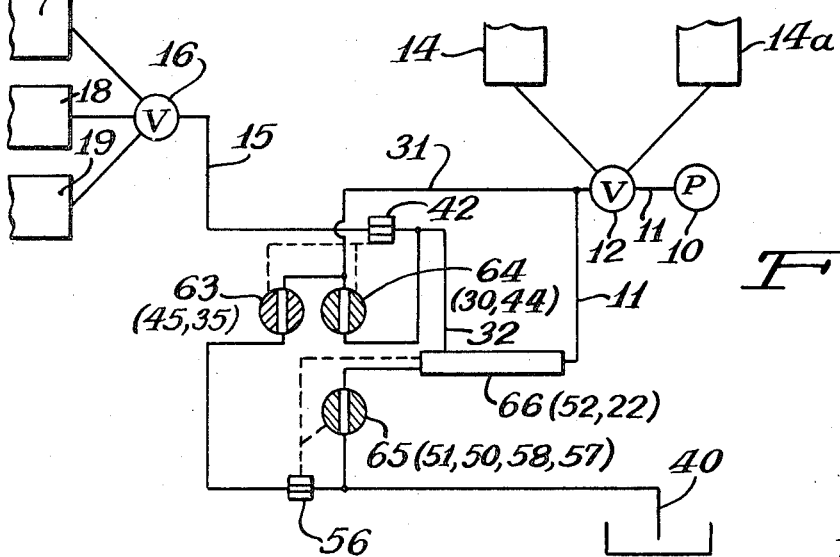
FIG. 5 is a view similar to FIG. 4, but with the parts of the hydraulic mechanism in the position of FIG. 2.

With reference to FIG. 4, at the outset, pressure fluid flows from the pump 10 through the line 11 by way of the valve 12, the connecting passage 32, the orifice 42, and the line 15 to the valve 16, whence the fluid goes selectively to the power unit 17, 18 or 19. At the start fluid does not flow in the line 31, because the valves 63 and 64 are closed. Almost immediately thereafter, as shown in FIG. 5, valves 63 and 64 are opened in response to flow of pressure fluid through the orifice 42, and now pressure fluid flows by way of the line 31 to the present mechanism. The fluid going through the valve 64 goes to the orifice 42 and the line 15 to the valve 16. The fluid going through the valve 63 acts against the orifice 56 to open the valve 65 and to shift the long orifice 66 to insert it between the line 11 and the connecting passage 32. The fluid going through the valve 63 passes through the orifice 56 to the drain line 40. The insertion of a major portion of the length of the long orifice 66 between the line 11 in the connecting passage 32 and the retention of only a small portion of the long orifice 66 between the connecting passage 32 and the valve 65 leading to drain 40, all as shown in FIG. 5, mean that the pressure of the fluid just in advance of the orifice 42 is only a little bit above drain pressure and thus quite a bit below pump pressure. When the selected power unit 17, 18, or 19 is filled, the fluid pressure therein is the same as the relatively low fluid pressure before the orifice 42.

On filling of the power unit 17, 18, or 19, flow of fluid through the orifice 42 stops, and so the valves 63 and 64 are closed, as shown in FIG. 6. Now fluid is trapped between the closed valve 63 and the relatively small orifice 56 and the spool 48 begins a slow return to the position of FIG. 1 under the action of spring 59, such slow return being determined by the slow passage of trapped fluid through the small orifice 56 to the drain line 40.

As the spool 48 returns, the long orifice 66, formed by the grooves 52 on the spool 48, moves with respect to the line 11 and the connecting passage 42, so as to decrease the portion of the orifice 66 connected between the line 11 and the connecting passage 32 and to increase the portion of the orifice 66 connected between the connecting passage 32 and the valve 65 leading to drain line 40. Such a shift of the long orifice 66 with respect to the connecting passage 32, which may be observed from a comparison of FIG. 6 with FIG. 7, produces an increase in pressure in passage 32 and the selected power unit 17, 18, or 19.

Finally a return to the position of FIG. 4 is achieved, in which the long orifice 66 is completely removed as a connection between the line 11 and the connecting passage 32.

By this time flow through the orifice 56 will have ceased, and thus the valve 65 will be closed. As a result of these changes, full fluid pressure is realized in the selected power unit 17, 18, or 19.

The important thing is that the rise of fluid pressure in the power unit 17, 18, or 19 is brought about relatively slowly, being dependent upon the relatively slow removal of a major portion of the length of the long orifice 66 as a connection between the line 11 and the connecting passage 32.

To recapitulate, the slowing of the pressure rise in the power unit 17, 18, or 19 by means of the hydraulic mechanism 13 assures that the direction clutch of the transmission will be fully engaged before the speed clutch. This is due to the fact that the power unit 14 and 14a for a direction clutch is brought to full pressure almost immediately upon opening of the valve 12, whereas the hydraulic mechanism 13 slows the assumption of full pressure in the power unit 17, 18, or 19.

The pressure rise in the power unit 17, 18, or 19 is controlled by the speed of the rate-of-rise spool 48 returning to the position of FIG. 1. Since the spool 48 returns slowly, there is, with the present device 13, a size reduction over accumulator-type devices. Also, the rate of rise of pressure in the power unit 17, 18, or 19 is not affected by excessive leakage due to poor clutch condition, because the said rate of rise is dependent on the rate of return of the spool 48 to the position of FIG. 1, which return is dependent on the size of the orifice 56 in the poppet 55. The fact that the clutch may be leaking is immaterial, for the orifice 56 operates to return the spool 48 to the position of FIG. 1 by means of the pressure fluid trapped by the closing of the valve 63. The closing of valve 63 is dependent only on the substantial lack of flow through the orifice 42 in the spool 41, and such flow stops when the selected power unit 17, 18, or 19 is substantially filled. Limited leakage at the clutch would be without effect.

Another important part of the present mechanism 13 is the orifice 42 in the quick-fill spool 41, which orifice is relatively large and permits the selected power unit 17, 18, or 19 to be filled rapidly, whereupon flow is cut off.

In the embodiment just described, each of the grooves 52 in the rate-of-rise spool 48 is of uniform width and depth. Such grooves may be modified so as to increase gradually in depth from the end at the groove 51 to that at the groove 53. The pressure will rise faster through the tapered-depth grooves into the power unit 17, 18, or 19 than it will through the uniform-depth grooves 52, as the rate-of-rise spool 48 and poppet 55 are returning to the position of FIG. 1 from that of FIG. 3. The higher rate-of-rise fluid pressure is due to the fact that the increasing depth of the grooves 52 produces a decreasing pressure loss per unit of length of the grooves 52 when considered in a direction toward the line 11.

A similar result will be reached if, from the initial size shown for the uniform-width grooves 52, the width of such grooves is made to increase slightly progressively in a direction from the groove 51 to the groove 53.

MODIFICATION—FIG. 8

It is also possible to achieve this same result by having both the widths and the depths of the grooves increase as at 52a in a direction from the groove 51 to the groove 53, as shown in the modification according to FIG. 8.

Variations within the spirit and scope of the invention described are equally comprehended by the foregoing description.

What is claimed is:

1. Hydraulic system for power mechanism included therein and selected from the group comprising power operated clutch cylinders, brake cylinders, and the like, and actuated by pressure having controlled rate-of-rise to apply the clutching, braking, and the like, said system comprising a power cylinder, a restriction having a fixed long length, first path means forming a first path for the flow of pressure fluid from a source to the power cylinder, inserting means for inserting a portion of the length of the restriction in the first path intermediate said source and cylinder for restricting rate-of-rise of pressure in the cylinder to limit rate of application of same, and second path means forming a second fluid path from the remaining portion of the restriction to drain.

2. A system specified in claim 1, the inserting means responsive to a flow characteristic of the pressure fluid in the first fluid path whereby initially to insert a major portion of the length of the long restriction in the first fluid path.

3. A system specified in claim 2, characterized by the inserting means responding to a further flow characteristic of the pressure fluid in the first path for slowly progressively decreasing the portion of the length of the restriction in the first fluid path and increasing in the second fluid path the restriction to a major portion of the length thereof.

4. A system specified in claim 1, the power cylinder characterized by a clutch cylinder.

5. An assembly comprising means forming a first path for the flow of pressure fluid from a source to a work object to be operated by the pressure fluid, means forming a long restricted orifice, means responsive to flow of pressure fluid in the first path for inserting a major portion of the length of the orifice in the first path, and means forming a second fluid path from the remaining lesser portion of said orifice to drain.

6. An assembly specified in claim 5 and further comprising means for operating after insertion of the long restricted orifice in the first path to shift said orifice for slowly progressively decreasing the portion of said orifice in the first path and increasing the portion of said orifice in the second path.

7. An assembly specified in claim 5 and further comprising means including a valve forming a third pressure-fluid path bridging the portion of the first path in which the long restricted orifice is inserted, and means responsive to flow of pressure fluid in the first path downstream of said orifice for opening the valve in the third path.

8. An assembly specified in claim 7 and further comprising a fourth path including a valve and a restricted orifice connected between a point on the second line and drain, and means responsive to flow of pressure fluid in the first path downstream of the orifice for opening the valve in the fourth path.

9. An assembly specified in claim 8 and further comprising a valve inserted in the said second path, the valve being openable by the action of the pressure fluid against the orifice in the fourth path.

10. An assembly specified in claim 9, the valve in the fourth path closing on cessation of flow of pressure fluid to the work object thus tapping fluid in the fourth path upstream of the orifice therein, the trapped fluid escaping slowly through said orifice to provide for a shift of the long restricted orifice in the first path for slowly progressively decreasing the portion of the last mentioned orifice in the first path and increasing the portion of said last mentioned orifice in the second path.

11. An assembly comprising
 (a) means forming a first path for the flow of pressure fluid from a source to a work object to be operated by the pressure fluid,
 (b) a first member having a relatively large orifice and being positioned in the first path,
 (c) means resiliently urging the first member to a retracted position in a direction opposed to the fluid flow,
  flow of pressure fluid through the orifice of the first member moving the same to an advanced position displaced from said retracted position in the direction of fluid flow, (d) means forming a second pressure-fluid path connecting a region of the first path upstream of the first member with drain, (e) means forming a third pressure-fluid path connecting two regions of the first path upstream of the first member, the fist member acting in its retracted position to close the second and third paths and in its advanced position to open the same, (f) a second member positioned in the second path, (g) means resiliently urging the second member to a retracted position in a direction opposed to the fluid flow to drain, (h) a third member having a relatively small orifice and being mounted on the second member, (i) means resiliently urging the third member to a retracted position with respect to the second member in a direction opposed to the fluid flow to drain, flow of pressure fluid through the orifice of the third member to drain moving the second member to an advanced position displaced from the retracted position in the direction of fluid flow and the third member to an advanced position with respect to the second member displaced from the retracted position of the third member in the direction of fluid flow, the second and third members having openings registrable with one another in the advanced position of the third member with respect to the second member to provide a fourth path for fluid flow from a region of the first path upstream of the first member and a region of the second path downstream of the orifice in the third member, the openings in the second and third members being out of registry in the retracted position of the third member with respect to the second member to block the fourth path.

12. The assembly as specified in claim 11, the second member having means forming a restricted orifice of appreciable length insertable in the section of the first fluid path across which the third fluid path is connected upon movement of the second member to its advanced position, whereby when sufficient filling of the work object with pressure fluid stops the flow thereof through the orifice of the first member and the first member returns to its retracted position and thereby closes the second and third paths, the work object is connected with the pressure source only by way of the first path and thus by way of the said restricted orifice inserted therein by movement of the second member to its advanced position and reaches full pressure slowly because of the restricted orifice, closing of the second path by return of the first member of its retracted position cuts the second and third members off from the pressure source and thus permits the second and third members to return to their retracted positions under the influence of the associated resilient means, such return being slowed by the trapping of pressure fluid in the second path upstream of the small orifice in the third member, the slow return of the second member resulting in slow shortening of the effective length of the restricted orifice of the second member applied to the first fluid path.

13. The assembly as specified in claim 12, the restricted orifice of appreciable length having one end connected with the opening in the second member so as to constitute a part of the fourth path for fluid flow from the first path to drain.

14. An assembly comprising (a) a body having first and second bores, (b) a quick-fill spool mounted in the first bore and resiliently urged toward one end thereof, the quick-fill spool having a relatively large orifice enabling flow of pressure fluid therethrough in a direction from the said one end of the first bore to the other end thereof to move the quick-fill spool in the same direction, (c) a rate-of-rise spool mounted in the second bore and resiliently urged toward one end thereof, (d) a poppet mounted in the rate-of-rise spool and having a relatively small orifice enabling flow of pressure fluid therethrough in a direction from said one end of the second bore to the other end to move the rate-of-rise spool in the same direction, the poppet being resiliently urged toward said one end of the second bore, the rate-of-rise spool and poppet having openings that are registrable upon movement of the poppet with respect to the rate-of-rise spool in response to flow of pressure fluid through the orifice in the poppet in a direction away from said one end of the second bore, the body having an outlet passage connected to said other end of the first bore, a first inlet passage connected to a region of the first bore intermediate its ends, a drain passage connected to said other end of the second bore, a second inlet passage connected to a region of the second bore, a first connecting passage connecting an intermediate region of the second bore with said one end of the first bore, a second connecting passage connecting a region of the first bore intermediate said other end of said bore and the first inlet passage, with the second bore near said one end thereof, the quick-fill spool having an external wide annular groove located at an intermediate region of the quick-fill spool and an external peripheral recess adjacent the end of the quick-fill spool facing said one end of the first bore, the rate-of-rise spool having a wide external annular groove near but spaced from the end of said spool facing said other end of the second bore, the said spool further having an external longitudinal narrow shallow groove extending from the opening in the said spool to the annular groove on said spool, whereby when at the outset the quick-fill spool and the rate-of-rise spool are at the first ends of the bores, pressure fluid is applied to move only the quick-fill spool being applied thereto only from the second inlet passage by way of the annular groove on the rate-of-rise spool, the first connecting passage, and said one end of the first bore, thereafter when the quick-fill spool is moved to said other end of the first bore, the peripheral recess on the quick-fill spool overlaps the first pressure passage to supply pressure fluid therefrom through the orifice in the quick-fill spool and through the outlet passage for performing work, and the annular groove on the quick-fill spool overlaps the first inlet passage and the second connecting passage so as to supply pressure fluid only from the first inlet passage to said one end of the second bore for moving the rate-of-rise spool to said other end of the second bore and the poppet in the same direction with respect to the rate-of-rise spool for communication of the openings in said spool and the poppet, part of the pressure fluid supplied through the quick-fill spool escaping by way of the second connecting passage, the orifice in the rate-of-rise spool, and the interior thereof to the drain passage, part of the pressure fluid supplied through the second inlet passage escaping by way of the longitudinal groove on the rate-of-rise spool and the registering openings in said spool and the poppet to the drain passage, the movement of the rate-of-rise spool to said other end of the second bore shifting the annular groove on the rate-of-rise spool so as to disconnect said groove from the first connecting passage except by way of the longitudinal groove on the rate-of-rise spool, and finally when pressure fluid ceases to flow out of the outlet passage and through the orifice in the quick-fill spool and the latter is returned to said one end of the first bore, the annular groove is moved out of overlapping relating with the second connecting passage so as to disconnect the first inlet passage from said one end of the second bore, the peripheral recess on the end of the quick-fill spool is moved out of overlapping relating with the first inlet passage to disconnect the latter from the interior of the quick-fill spool and the outlet passage, and the outlet passage is connected with the second inlet passage only by way of the longitudinal groove on the rate-of-rinse spool.

15. Hydraulic fluid operated power train system for operating at least one direction clutch in the train and one speed clutch in the train and connected in that order therein, comprising a direction clutch cylinder, a speed clutch cylinder, first path means forming a first path for the flow of pressure fluid from a source to the speed clutch cylinder, relatively unrestricted path means forming a relatively unrestricted path for the flow of pressure fluid from a source to the direction clutch cylinder, inserting means for inserting a portion of the length of a long restriction in the first path intermediate said source and speed cylinder, means forming another fluid path from the remaining portion of the restriction to drain, and means for slowly progressively decreasing the portion of said restriction in the first path whereby final engagement pressure of the speed clutch is delayed until after the direction clutch is engaged.

16. Procedure for hydraulic fluid operated engagement of a power train including at least one direction clutch operated by a direction clutch cylinder and at least one speed clutch operated by a speed clutch cylinder, and connected in that order in the power train, said procedure comprising the steps of: directing fluid flow in a first fluid path to one speed clutch cylinder and directing the flow in a relatively unrestricted fluid path to one direction clutch cylinder, inserting a major portion of the length of a long restriction in the first path, directing the flow in another fluid path from the remaining portion of the restriction to drain, and slowly progressively decreasing the portion of said restriction in the first path whereby final engagement pressure of the speed clutch is delayed until after the direction clutch is engaged.

17. Procedure for engaging hydraulic power mechanism selected from the group comprising power operated clutch cylinders, power operated brake cylinders, and the like, so as to actuate same by pressure having a controlled rate-of-rise to apply the clutching, braking, and the like, said procedure comprising the steps of: directing the flow in a first fluid path to a power cylinder, inserting a portion of the length of a long restriction in the first path for restricting rate-of-rise of pressure in the cylinder to limit rate of application of same, and directing flow in a second fluid path from the remaining portion of the restriction to drain.

18. Procedure as specified in claim 17, characterized preliminarily with a quick-fill and slack take-up step by a preliminarily directed substantial flow of fluid in the first path to the power cylinder.

19. Procedure as specified in claim 17, characterized by production and application of a signal responsive to flow of pressure fluid in the first fluid path so as initially to insert a major portion of the length of the long restriction in the first fluid path.

20. Procedure as specified in claim 17 characterized by production and application of a signal responsive to the flow of pressure fluid in the first path so as slowly and progressively to decrease the portion of the length of the restricted in the first fluid path and increase in the second fluid path the restriction to the point at which the major portion of the length thereof is in the second fluid path.

21. Procedure as specified in claim 20 wherein said first fluid path includes a pressure tap point on the restriction variably spaced from the one end of the length of the restriction connected to drain, said procedure further characterized by the step of linearly shifting the pressure tap point from said one end by a distance along the length of the restriction whereby the magnitude of pressure tapped off varies as a function of said distance.

References Cited

UNITED STATES PATENTS

| 1,999,834 | 4/1935 | Ernst | 91—412X |
| 2,085,303 | 6/1937 | Ernst | 60—97SEQUX |
| 2,585,297 | 2/1952 | Beuscher | 60—52H.F.X |

EDGAR W. GEOGHEGAN, Primary Examiner

U.S. Cl. X.R.

60—97; 91—412; 137—111